United States Patent
McMahon et al.

(10) Patent No.: US 7,862,719 B2
(45) Date of Patent: Jan. 4, 2011

(54) SQUARE MEMBRANE MANIFOLD SYSTEM

(75) Inventors: Robert James McMahon, Leichhardt (AU); David John Cox, Penrith (AU); Fufang Zha, West Ryde (AU); Roger William Phelps, Kings Langley (AU); Warren Thomas Johnson, Grose Wold (AU); Sargon Barkho, Hillsdale (AU)

(73) Assignee: Siemens Water Technologies Corp., Warrendale, PA (US)

( * ) Notice: Subject to any disclaimer, the term of this patent is extended or adjusted under 35 U.S.C. 154(b) by 715 days.

(21) Appl. No.: 11/660,694

(22) PCT Filed: Aug. 19, 2005

(86) PCT No.: PCT/AU2005/001253

§ 371 (c)(1),
(2), (4) Date: Oct. 26, 2007

(87) PCT Pub. No.: WO2006/017911

PCT Pub. Date: Feb. 23, 2006

(65) Prior Publication Data

US 2008/0210623 A1 Sep. 4, 2008

(30) Foreign Application Priority Data

Aug. 20, 2004 (AU) .............................. 2004904769

(51) Int. Cl.
*B01D 65/02* (2006.01)
*B01D 29/00* (2006.01)
*B01D 37/00* (2006.01)
*B01D 35/20* (2006.01)

(52) U.S. Cl. .................. 210/321.69; 210/232; 210/240; 210/321.6; 210/321.79; 210/321.8; 210/321.88; 210/321.89; 210/323.1; 210/356; 210/391; 210/442; 210/483; 210/485; 210/496; 210/500.23

(58) Field of Classification Search ................. 210/232, 210/236, 240, 321.6, 321.69, 321.79, 321.8, 210/321.88, 321.89, 323.1, 323.2, 340, 356, 210/391, 442, 636
See application file for complete search history.

(56) References Cited

U.S. PATENT DOCUMENTS 256,008 A 4/1882 Leak (Continued)

FOREIGN PATENT DOCUMENTS

AU 34400/84 9/1983

(Continued)

OTHER PUBLICATIONS

Almulla et al., Desalination, 153 (2002), pp. 237-243.
Anonymous, "*Nonwoven Constructions of Dyneon™ THV and Dyneon™ THE Fluorothermoplastics*", Research Disclosure Journal, Apr. 1999, RD 420013, 2 pages.

(Continued)

*Primary Examiner*—John Kim
(74) *Attorney, Agent, or Firm*—Lando & Anastasi, LLP

(57) ABSTRACT

A membrane module (3) comprising a plurality of porous hollow membranes (8). The membranes (8) extend between and are fixed at each end in a header (5, 6). One header (6) has one or more of openings (12) formed therein. The openings (12) are in fluid communication with a source of gas and/or liquid (13, 14, 15). The other of the headers (5) is sealingly connected to and in fluid communication with a head-piece (9). The head-piece (9) is adapted to couple to an associated head-piece of a further module to form a rack of modules (17). A potting head (6) for use in mounting porous hollow membranes (8) is also disclosed comprising a preformed potting element (29). The potting element (29) includes one or more cavities (30) for receiving curate potting material which, in use, supports said membranes (8).

22 Claims, 9 Drawing Sheets

U.S. PATENT DOCUMENTS

| | | |
|---|---|---|
| 285,321 A | 9/1883 | Tams |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |
| 3,442,002 A | 5/1969 | Geary et al. |
| 3,462,362 A | 8/1969 | Kollsman |
| 3,492,698 A | 2/1970 | Geary et al. |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin, III |
| 3,700,561 A | 10/1972 | Ziffer |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A * | 10/1989 | Kopp et al. ................. 210/644 |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |

| Patent | Type | Date | Inventor |
|---|---|---|---|
| 5,069,065 | A | 12/1991 | Sprunt et al. |
| 5,075,065 | A | 12/1991 | Effenberger et al. |
| 5,076,925 | A | 12/1991 | Roesink et al. |
| 5,079,272 | A | 1/1992 | Allegrezza et al. |
| 5,094,750 | A | 3/1992 | Kopp et al. |
| 5,094,867 | A | 3/1992 | Detering et al. |
| 5,098,567 | A | 3/1992 | Nishiguchi |
| 5,104,535 | A | 4/1992 | Cote et al. |
| 5,104,546 | A | 4/1992 | Filson et al. |
| H1045 | H | 5/1992 | Wilson |
| 5,135,663 | A | 8/1992 | Newberth, III et al. |
| 5,137,631 | A | 8/1992 | Eckman et al. |
| 5,138,870 | A | 8/1992 | Lyssy |
| 5,147,553 | A | 9/1992 | Waite |
| 5,151,191 | A | 9/1992 | Sunaoka et al. |
| 5,151,193 | A | 9/1992 | Grobe et al. |
| 5,158,721 | A | 10/1992 | Allegrezza, Jr. et al. |
| 5,169,528 | A | 12/1992 | Karbachsch et al. |
| 5,182,019 | A | 1/1993 | Cote et al. |
| 5,192,442 | A | 3/1993 | Piccirillo et al. |
| 5,192,456 | A | 3/1993 | Ishida et al. |
| 5,192,478 | A | 3/1993 | Caskey |
| 5,194,149 | A | 3/1993 | Selbie et al. |
| 5,198,116 | A | 3/1993 | Comstock et al. |
| 5,198,162 | A | 3/1993 | Park et al. |
| 5,209,852 | A | 5/1993 | Sunaoka et al. |
| 5,211,823 | A | 5/1993 | Giuffrida et al. |
| 5,221,478 | A | 6/1993 | Dhingra et al. |
| 5,227,063 | A | 7/1993 | Langerak et al. |
| 5,248,424 | A | 9/1993 | Cote et al. |
| 5,262,054 | A | 11/1993 | Wheeler |
| 5,271,830 | A | 12/1993 | Faivre et al. |
| 5,275,766 | A | 1/1994 | Gadkaree et al. |
| 5,286,324 | A | 2/1994 | Kawai et al. |
| 5,290,457 | A | 3/1994 | Karbachsch et al. |
| 5,297,420 | A | 3/1994 | Gilliland et al. |
| 5,316,671 | A | 5/1994 | Murphy |
| 5,320,760 | A | 6/1994 | Freund et al. |
| 5,353,630 | A | 10/1994 | Soda et al. |
| 5,358,732 | A | 10/1994 | Seifter et al. |
| 5,361,625 | A | 11/1994 | Ylvisaker |
| 5,364,527 | A | 11/1994 | Zimmerman et al. |
| 5,364,529 | A | 11/1994 | Morin et al. |
| 5,374,353 | A | 12/1994 | Murphy |
| 5,389,260 | A | 2/1995 | Hemp et al. |
| 5,393,433 | A | 2/1995 | Espenan et al. |
| 5,396,019 | A | 3/1995 | Sartori et al. |
| 5,401,401 | A | 3/1995 | Hickok et al. |
| 5,401,405 | A | 3/1995 | McDougald |
| 5,403,479 | A | 4/1995 | Smith et al. |
| 5,405,528 | A | 4/1995 | Selbie et al. |
| 5,411,663 | A | 5/1995 | Johnson |
| 5,417,101 | A | 5/1995 | Weich |
| 5,419,816 | A | 5/1995 | Sampson et al. |
| 5,451,317 | A | 9/1995 | Ishida et al. |
| 5,468,397 | A | 11/1995 | Barboza et al. |
| 5,470,469 | A | 11/1995 | Eckman |
| 5,477,731 | A | 12/1995 | Mouton |
| 5,479,590 | A | 12/1995 | Lin |
| 5,480,553 | A | 1/1996 | Yamamori et al. |
| 5,484,528 | A | 1/1996 | Yagi et al. |
| 5,490,939 | A | 2/1996 | Gerigk et al. |
| 5,491,023 | A | 2/1996 | Tsai et al. |
| 5,501,798 | A | 3/1996 | Al-Samadi et al. |
| 5,525,220 | A | 6/1996 | Yagi et al. |
| 5,531,848 | A | 7/1996 | Brinda et al. |
| 5,531,900 | A | 7/1996 | Raghaven et al. |
| 5,543,002 | A | 8/1996 | Brinda et al. |
| 5,552,047 | A | 9/1996 | Oshida et al. |
| 5,554,283 | A | 9/1996 | Brinda et al. |
| 5,556,591 | A | 9/1996 | Jallerat et al. |
| 5,575,963 | A | 11/1996 | Soffer et al. |
| 5,597,732 | A | 1/1997 | Bryan-Brown |
| 5,607,593 | A | 3/1997 | Cote et al. |
| 5,639,373 | A | 6/1997 | Mahendran et al. |
| 5,643,455 | A | 7/1997 | Kopp et al. |
| 5,647,988 | A | 7/1997 | Kawanishi et al. |
| 5,670,053 | A | 9/1997 | Collentro et al. |
| 5,677,360 | A | 10/1997 | Yamamori et al. |
| 5,688,460 | A | 11/1997 | Ruschke |
| 5,733,456 | A | 3/1998 | Okey et al. |
| 5,744,037 | A | 4/1998 | Fujimura et al. |
| 5,747,605 | A | 5/1998 | Breant et al. |
| 5,766,479 | A | 6/1998 | Collentro et al. |
| 5,783,083 | A | 7/1998 | Henshaw et al. |
| 5,843,069 | A | 12/1998 | Butler et al. |
| 5,846,424 | A | 12/1998 | Khudenko |
| 5,888,401 | A | 3/1999 | Nguyen |
| 5,895,570 | A | 4/1999 | Liang |
| 5,906,739 | A | 5/1999 | Osterland et al. |
| 5,906,742 | A | 5/1999 | Wang et al. |
| 5,910,250 | A | 6/1999 | Mahendran et al. |
| 5,914,039 | A | 6/1999 | Mahendran et al. |
| 5,918,264 | A | 6/1999 | Drummond et al. |
| 5,942,113 | A | 8/1999 | Morimura |
| 5,944,997 | A | 8/1999 | Pedersen et al. |
| 5,951,878 | A | 9/1999 | Astrom |
| 5,958,243 | A | 9/1999 | Lawrence et al. |
| 5,968,357 | A | 10/1999 | Doelle et al. |
| 5,988,400 | A | 11/1999 | Karachevtcev et al. |
| 5,997,745 | A | 12/1999 | Tonelli et al. |
| 6,017,451 | A | 1/2000 | Kopf |
| 6,024,872 | A | 2/2000 | Mahendran |
| 6,036,030 | A | 3/2000 | Stone et al. |
| 6,039,872 | A | 3/2000 | Wu et al. |
| 6,042,677 | A | 3/2000 | Mahendran et al. |
| 6,045,698 | A | 4/2000 | Côté et al. |
| 6,045,899 | A | 4/2000 | Wang et al. |
| 6,048,454 | A | 4/2000 | Jenkins |
| 6,048,455 | A | 4/2000 | Janik |
| 6,066,401 | A | 5/2000 | Stilburn |
| 6,074,718 | A | 6/2000 | Puglia et al. |
| 6,077,435 | A | 6/2000 | Beck et al. |
| 6,083,393 | A | 7/2000 | Wu et al. |
| 6,096,213 | A | 8/2000 | Radovanovic et al. |
| 6,113,782 | A | 9/2000 | Leonard |
| 6,120,688 | A | 9/2000 | Daly et al. |
| 6,126,819 | A | 10/2000 | Heine et al. |
| 6,146,747 | A | 11/2000 | Wang et al. |
| 6,149,817 | A | 11/2000 | Peterson et al. |
| 6,156,200 | A | 12/2000 | Zha et al. |
| 6,159,373 | A | 12/2000 | Beck et al. |
| 6,193,890 | B1 | 2/2001 | Pedersen et al. |
| 6,202,475 | B1 | 3/2001 | Selbie et al. |
| 6,214,231 | B1 | 4/2001 | Cote et al. |
| 6,214,232 | B1 | 4/2001 | Baurmeister et al. |
| 6,221,247 | B1 | 4/2001 | Nemser et al. |
| 6,245,239 | B1 | 6/2001 | Cote et al. |
| 6,254,773 | B1 | 7/2001 | Biltoft |
| 6,264,839 | B1 | 7/2001 | Mohr et al. |
| 6,277,512 | B1 | 8/2001 | Hamrock et al. |
| 6,280,626 | B1 | 8/2001 | Miyashita et al. |
| 6,284,135 | B1 | 9/2001 | Ookata |
| 6,290,756 | B1 | 9/2001 | Macheras et al. |
| 6,294,039 | B1 | 9/2001 | Mahendran et al. |
| 6,299,773 | B1 | 10/2001 | Takamura et al. |
| 6,303,026 | B1 | 10/2001 | Lindbo |
| 6,303,035 | B1 | 10/2001 | Cote et al. |
| 6,315,895 | B1 | 11/2001 | Summerton et al. |
| 6,322,703 | B1 | 11/2001 | Taniguchi et al. |
| 6,325,928 | B1 | 12/2001 | Pedersen et al. |
| 6,337,018 | B1 | 1/2002 | Mickols |
| RE37,549 | E | 2/2002 | Mahendran et al. |
| 6,354,444 | B1 | 3/2002 | Mahendran |
| 6,361,695 | B1 | 3/2002 | Husain et al. |
| 6,368,819 | B1 | 4/2002 | Gaddy et al. |

| | | | |
|---|---|---|---|
| 6,375,848 B1 | 4/2002 | Cote et al. | |
| 6,387,189 B1 | 5/2002 | Gröschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,485,645 B1 | 11/2002 | Husain et al. | |
| 6,495,041 B2 | 12/2002 | Taniguchi et al. | |
| 6,524,481 B2 | 2/2003 | Zha et al. | |
| 6,524,733 B1 | 2/2003 | Nonobe | |
| 6,550,747 B2 | 4/2003 | Rabie et al. | |
| 6,555,005 B1 | 4/2003 | Zha et al. | |
| 6,576,136 B1 | 6/2003 | De Moel et al. | |
| D478,913 S | 8/2003 | Johnson et al. | |
| 6,620,319 B2 | 9/2003 | Behmann et al. | |
| 6,627,082 B2 | 9/2003 | Del Vecchio | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,189 B2 | 3/2004 | Rabie et al. | |
| 6,708,957 B2 | 3/2004 | Cote et al. | |
| 6,721,529 B2 | 4/2004 | Chen et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,758,972 B2 | 7/2004 | Vriens et al. | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,912 B2 | 9/2004 | Blong | |
| 6,805,806 B2 | 10/2004 | Arnaud | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,841,070 B2 | 1/2005 | Zha et al. | |
| 6,861,466 B2 | 3/2005 | Dadalas et al. | |
| 6,863,817 B2 | 3/2005 | Liu et al. | |
| 6,863,823 B2 | 3/2005 | Côté | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowel | |
| 7,018,530 B2 | 3/2006 | Pollock | |
| 7,018,533 B2 | 3/2006 | Johnson et al. | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,172,701 B2 | 2/2007 | Gaid et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,300,022 B2 | 11/2007 | Muller | |
| 2001/0047962 A1 * | 12/2001 | Zha et al. ................... 210/636 |
| 2002/0070157 A1 | 6/2002 | Yamada | |
| 2002/0148767 A1 | 10/2002 | Johnson et al. | |
| 2002/0153313 A1 | 10/2002 | Cote | |
| 2003/0038080 A1 | 2/2003 | Vriens et al. | |
| 2003/0057155 A1 | 3/2003 | Husain et al. | |
| 2003/0127388 A1 | 7/2003 | Ando et al. | |
| 2003/0146153 A1 | 8/2003 | Cote et al. | |
| 2003/0150807 A1 | 8/2003 | Bartels et al. | |
| 2003/0178365 A1 | 9/2003 | Zha et al. | |
| 2003/0226797 A1 | 12/2003 | Phelps | |
| 2004/0007525 A1 | 1/2004 | Rabie et al. | |
| 2004/0035770 A1 | 2/2004 | Edwards et al. | |
| 2004/0084369 A1 | 5/2004 | Zha et al. | |
| 2004/0145076 A1 | 7/2004 | Zha et al. | |
| 2004/0168979 A1 | 9/2004 | Zha et al. | |
| 2004/0178154 A1 | 9/2004 | Zha et al. | |
| 2004/0217053 A1 | 11/2004 | Zha et al. | |
| 2004/0232076 A1 | 11/2004 | Zha et al. | |
| 2005/0029185 A1 | 2/2005 | Muller | |
| 2005/0029186 A1 | 2/2005 | Muller | |
| 2005/0032982 A1 | 2/2005 | Muller et al. | |
| 2005/0103722 A1 | 5/2005 | Freydina et al. | |
| 2005/0115880 A1 | 6/2005 | Pollock | |
| 2005/0115899 A1 | 6/2005 | Liu et al. | |
| 2005/0139538 A1 | 6/2005 | Lazaredes | |
| 2005/0194310 A1 | 9/2005 | Yamamoto et al. | |
| 2005/0194315 A1 | 9/2005 | Adams et al. | |
| 2006/0000775 A1 | 1/2006 | Zha et al. | |
| 2006/0131234 A1 | 6/2006 | Zha et al. | |
| 2006/0201876 A1 | 9/2006 | Jordan | |
| 2006/0261007 A1 | 11/2006 | Zha et al. | |
| 2006/0273038 A1 | 12/2006 | Syed et al. | |
| 2007/0007214 A1 | 1/2007 | Zha et al. | |
| 2007/0056905 A1 | 3/2007 | Beck et al. | |
| 2007/0075021 A1 | 4/2007 | Johnson | |
| 2007/0108125 A1 | 5/2007 | Cho et al. | |
| 2007/0227973 A1 | 10/2007 | Zha et al. | |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 3904544 A1 | 8/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |

| | | | | | |
|---|---|---|---|---|---|
| EP | 763758 A1 | 3/1997 | JP | 05-023557 | 2/1993 |
| EP | 824956 A2 | 2/1998 | JP | 05-096136 | 4/1993 |
| EP | 855214 A1 | 7/1998 | JP | 05-137977 | 6/1993 |
| EP | 627255 B1 | 1/1999 | JP | 05-157654 | 6/1993 |
| EP | 911073 A1 | 4/1999 | JP | 05-285348 | 11/1993 |
| EP | 920904 A2 | 6/1999 | JP | 06-071120 | 3/1994 |
| EP | 1034835 A1 | 9/2000 | JP | 06-114240 | 4/1994 |
| EP | 1052012 A1 | 11/2000 | JP | 06-218237 | 8/1994 |
| EP | 1349644 | 10/2003 | JP | 06-277469 | 10/1994 |
| EP | 1350555 A1 | 10/2003 | JP | 06-285496 | 10/1994 |
| EP | 1236503 B1 | 8/2004 | JP | 06-343837 | 12/1994 |
| FR | 2620712 | 3/1989 | JP | 07-000770 | 1/1995 |
| FR | 2674448 | 10/1992 | JP | 07-024272 | 1/1995 |
| FR | 2699424 | 6/1994 | JP | 07-068139 | 3/1995 |
| GB | 702911 | 1/1954 | JP | 07-136470 | 5/1995 |
| GB | 2253572 A | 9/1992 | JP | 07-136471 | 5/1995 |
| JP | 54-162684 | 12/1979 | JP | 07-155758 | 6/1995 |
| JP | 55-129155 | 6/1980 | JP | 07-178323 | 7/1995 |
| JP | 55-099703 | 7/1980 | JP | 07-185268 | 7/1995 |
| JP | 55-129107 | 10/1980 | JP | 07-185271 | 7/1995 |
| JP | 56-021604 | 2/1981 | JP | 07-236819 | 9/1995 |
| JP | 56-118701 | 9/1981 | JP | 07-251043 | 10/1995 |
| JP | 56-121685 | 9/1981 | JP | 07-275665 | 10/1995 |
| JP | 58-088007 | 5/1983 | JP | 07-289860 | 11/1995 |
| JP | 60-019002 | 1/1985 | JP | 07-303895 | 11/1995 |
| JP | 60-206412 | 10/1985 | JP | 08-010585 | 1/1996 |
| JP | 61-097005 | 5/1986 | JP | 09-072993 | 3/1997 |
| JP | 61-097006 | 5/1986 | JP | 09-099227 | 4/1997 |
| JP | 61-107905 | 5/1986 | JP | 09-141063 | 6/1997 |
| JP | 61-167406 | 7/1986 | JP | 09-187628 | 7/1997 |
| JP | 61-167407 | 7/1986 | JP | 09-220569 | 8/1997 |
| JP | 61-171504 | 8/1986 | JP | 09-271641 | 10/1997 |
| JP | 61-192309 | 8/1986 | JP | 09-324067 | 12/1997 |
| JP | 61-222510 | 10/1986 | JP | 10-033955 | 2/1998 |
| JP | 61-242607 | 10/1986 | JP | 10-048466 | 2/1998 |
| JP | 61-249505 | 11/1986 | JP | 10-085565 | 4/1998 |
| JP | 61-257203 | 11/1986 | JP | 10-156149 | 6/1998 |
| JP | 61-263605 | 11/1986 | JP | 11-028467 | 2/1999 |
| JP | 61-291007 | 12/1986 | JP | 11-156166 | 6/1999 |
| JP | 61-293504 | 12/1986 | JP | 11-165200 | 6/1999 |
| JP | 62-004408 | 1/1987 | JP | 11-333265 | 7/1999 |
| JP | 62-114609 | 5/1987 | JP | 11-033365 | 9/1999 |
| JP | 62-140607 | 6/1987 | JP | 11-319507 | 11/1999 |
| JP | 62-144708 | 6/1987 | JP | 2000-070684 | 3/2000 |
| JP | 62-163708 | 7/1987 | JP | 2000-185220 | 4/2000 |
| JP | 62-179540 | 8/1987 | JP | 2000-157850 | 6/2000 |
| JP | 62-250908 | 10/1987 | JP | 2000-317276 | 11/2000 |
| JP | 63-097634 | 4/1988 | JP | 2001-009246 | 1/2001 |
| JP | 63-143905 | 6/1988 | JP | 2001-070967 | 3/2001 |
| JP | 63-171607 | 7/1988 | JP | 2001-079367 | 3/2001 |
| JP | 63-180254 | 7/1988 | JP | 2001-104760 | 4/2001 |
| JP | S63-38884 | 10/1988 | JP | 2001-190937 | 7/2001 |
| JP | 01-151906 | 6/1989 | JP | 2001-190938 | 7/2001 |
| JP | 01-307409 | 12/1989 | JP | 2001-205055 | 7/2001 |
| JP | 02-026625 | 1/1990 | JP | 2000-342932 | 12/2002 |
| JP | 02-031200 | 2/1990 | JP | 2003-047830 | 2/2003 |
| JP | 02-107318 | 4/1990 | JP | 2003-062436 | 3/2003 |
| JP | 02-126922 | 5/1990 | JP | 2003-135935 | 5/2003 |
| JP | 02-144132 | 6/1990 | KR | 2002-0090967 | 12/2002 |
| JP | 02-164423 | 6/1990 | NL | 1020491 C | 10/2003 |
| JP | 02-277528 | 11/1990 | NL | 1021197 C | 10/2003 |
| JP | 02-284035 | 11/1990 | WO | WO 88-06200 | 8/1988 |
| JP | 03-018373 | 1/1991 | WO | WO 89-00880 | 2/1989 |
| JP | 03-028797 | 2/1991 | WO | WO 90-00434 | 1/1990 |
| JP | 03-110445 | 5/1991 | WO | WO 91-04783 | 4/1991 |
| JP | 04-187224 | 7/1992 | WO | WO 91-16124 | 10/1991 |
| JP | 04-250898 | 9/1992 | WO | WO 93-02779 | 2/1993 |
| JP | 04-256424 | 9/1992 | WO | WO 93-15827 | 8/1993 |
| JP | 04-265128 | 9/1992 | WO | WO 93-23152 | 11/1993 |
| JP | 04-293527 | 10/1992 | WO | WO 94-11094 | 5/1994 |
| JP | 04-310223 | 11/1992 | WO | WO 95-34424 | 12/1995 |
| JP | 04-334530 | 11/1992 | WO | WO 96-07470 A1 | 3/1996 |
| JP | 04-348252 | 12/1992 | WO | WO 96-28236 | 9/1996 |

| WO | WO 96-41676 | 12/1996 |
| WO | WO 97-06880 | 2/1997 |
| WO | WO 98-22204 | 5/1998 |
| WO | WO 98-25694 | 6/1998 |
| WO | WO 98-28066 | 7/1998 |
| WO | WO 98-53902 | 12/1998 |
| WO | WO 98-01207 | 1/1999 |
| WO | WO 99-59707 | 11/1999 |
| WO | WO 00-30742 | 6/2000 |
| WO | WO 01-00307 | 1/2001 |
| WO | WO 01-32299 | 5/2001 |
| WO | WO 01-36075 | 5/2001 |
| WO | WO 01-45829 A1 | 6/2001 |
| WO | WO 02-40140 A1 | 5/2002 |
| WO | WO 03-000389 A2 | 1/2003 |
| WO | WO 03-013706 A1 | 2/2003 |
| WO | WO 2004-101120 A1 | 11/2004 |
| WO | WO 2005-021140 A1 | 3/2005 |
| WO | WO 2005-037414 A1 | 4/2005 |
| WO | WO 2005-077499 A1 | 8/2005 |
| WO | WO 2006-029456 A1 | 3/2006 |

OTHER PUBLICATIONS

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for water reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2$^{nd}$ Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Recent Advances in Microfiltration for Drinking Water Treatment; An Introduction to CMF-S, Presentation.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwm-mrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWeed® Membrane Filtration Equipment System for the City of Westminster, Colorado, Proposal No. 479-99," Mar. 2000, entire publication.

* cited by examiner

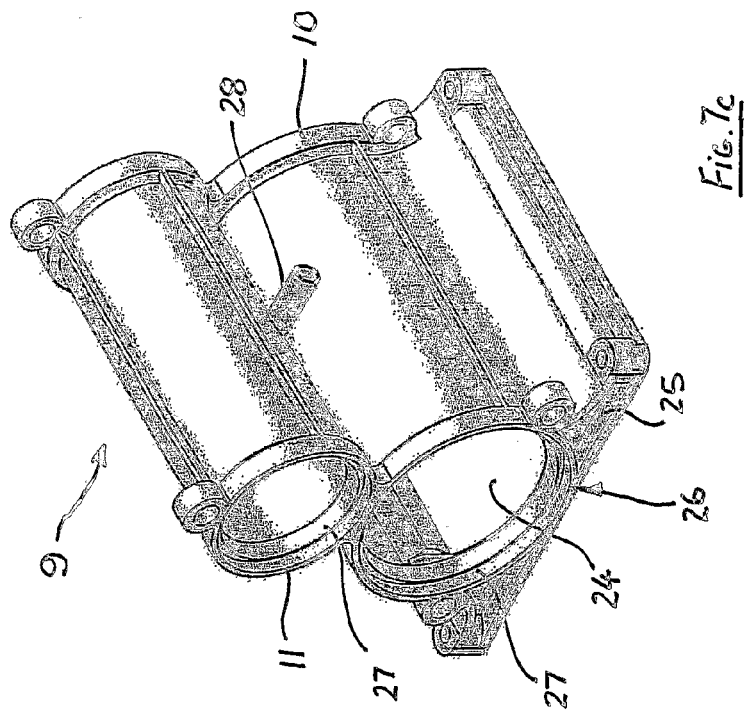
Fig. 7c
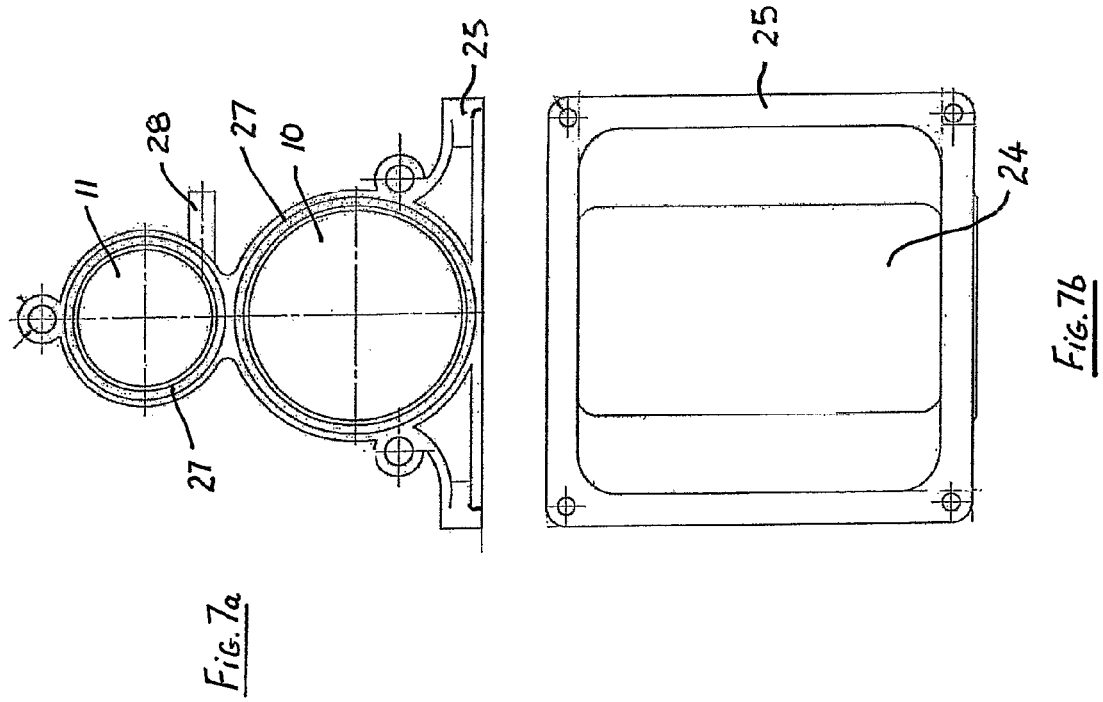
Fig. 7a
Fig. 7b

SQUARE MEMBRANE MANIFOLD SYSTEM

TECHNICAL FIELD

The present invention relates to submerged membrane filtration systems and more particularly to those types used in bioreactor processes.

BACKGROUND ART

A variety of membrane filtration systems are known and many of these use pressurised systems operating at high transmembrane pressures (TMP) to produce effective filtering and high filtrate flux. These systems are highly effective but are also expensive to produce, operate and maintain. Simpler systems using membrane arrays freely mounted vertically in a tank and using suction applied to the fibre lumens to produce TMP have also been developed, however, these systems have been found in the past to be less effective than the pressurised systems.

Examples of such known systems are illustrated in U.S. Pat. No. 5,192,456 to Ishida et al, U.S. Pat. No. 5,248,424 to Cote et al and WO 97/06880 to Zenon Environmental Inc.

Recent developments have used combinations of gas scouring and backwashing in non-pressurised submerged membrane systems to improve operating efficiency. Many of these systems require complex and expensive manifolding to provide the required delivery/removal of liquids and gas at various stages of the process. The configuration and footprint of modules has also become important to many users of such systems.

DISCLOSURE OF THE INVENTION

The present invention relates particularly to a plurality of porous membranes arranged to form a membrane module. These porous membranes may be in the form of fibres or plate type membranes as described in the above prior art.

The present invention seeks to overcome or at least ameliorate the problems of the prior art by providing a simple, effective manifolding and mounting system for submerged membranes modules.

According to a first aspect, the present invention provides a membrane module comprising a plurality of porous hollow membranes, said membranes extending between and being fixed at each end in a header, one header having one or more of openings formed therein; said openings being in fluid communication with a source of gas and/or liquid; the other of said headers being sealingly connected to and in fluid communication with a head-piece; said head-piece being adapted to couple to an associated head-piece of a further module to form a rack of modules.

Preferably, the headpiece includes a filtrate conduit in fluid communication with open ends of said membranes for the withdrawal of filtrate therefrom. For further preference the headpiece includes a further gas/air conduit for communicating gas/air to the module.

Preferably, the module is square or rectangular shaped in cross-section. For preference a skirt is provided around a perimeter of a bottom face of said one header for directing said gas and or liquid into said openings. For preference, said membranes are mounted vertically and the source of liquid may include an opening in a conduit carrying gas and/or liquid positioned below said skirt. For further preference, said opening comprises a nozzle, jet or the like. For preference the source of gas includes a pipe or tube passing through a sidewall of said skirt, the distal end of said pipe being positioned below said openings for feeding gas thereto. In one embodiment the pipe or tube is connected to the gas/air conduit of the headpiece. Preferably, said skirt is arranged to mix said gas and liquid before passing through said openings.

For preference, the headers are spaced and supported by one or more support members longitudinally extending between the headers. Preferably the support members are rods. In one arrangement one of more of the support members are hollow tubes and used to supply gas to the skirt from the gas/air conduit.

Preferably, the membranes are enclosed along part of their length by a screen for retaining gas/air bubbles and liquid flow within the module. The screen may be impervious or substantially impervious to gas/air bubbles or liquid or both.

Preferably, the membranes comprise porous hollow fibres, the fibres being fixed at each end in a header, the lower header having one or more openings formed therein. The fibres are normally sealed at the lower end and open at their upper end to allow removal of filtrate. The fibres are preferably arranged in partitioned bundles.

Preferably, the openings are positioned to coincide with the spaces formed between said partitioned bundles. For preference, said openings comprise a slot, slots or one or more rows of holes. Preferably, the partitioned fibre bundles are located in the potting head between the slots or the one or more rows of holes.

For further preference, gas bubbles are entrained or mixed with a liquid flow before being fed through the openings, though it will be appreciated that gas only may be used in some configurations. The liquid used may be the feed to the membrane module. The fibres and/or fibre bundles may cross over one another between the potting heads though it is desirable that they do not.

In one form of the invention, the upper and lower potting heads are molded from a plastic material, typically injection-molded nylon, though it will be appreciated that other suitable molding materials could be used. The use of molded heads reduces the amount of potting material (e.g. polyurethane) required while also enabling intricate shapes to be formed in the potting heads for use with high strength mounting and connection arrangements. This results in cost reductions and more flexibility in mounting and connection arrangements.

According to a second aspect, the present invention provides a membrane module rack including a plurality of membrane modules according to the first aspect connected together by said headpieces. Preferably, the lower headers are also connected together by connection means. For preference, this connection means may be proved by interlocking formations provided on adjacent lower headers of the modules. For further preference, the formations are guides that slide into each other to interlock the adjacent headers and remove the need for extra loose parts.

Filtrate is normally withdrawn from the fibres by application of suction applied thereto, however, it will be appreciated that any suitable means of providing TMP may be used.

According to a preferred further aspect, the present invention provides a filtration system including a rack of membrane modules according to said second aspect wherein said modules are positioned vertically in a tank containing feed liquid to be filtered, means to apply a transmembrane pressure to said membranes in said modules to cause filtrate to pass through pores in said membranes and means to supply continually or intermittently a supply of gas to said openings so as to produce gas bubbles which move upwardly between said fibres to scour the outer surfaces thereof.

Preferably the supply of gas to said openings includes a mixture of gas and liquid.

It should be understood that the term "gas" used herein includes any gas, including air and mixtures of gases as well as ozone and the like.

The embodiments of the invention will be described in relation to micro porous fibre membranes employed in a bioreactor type application, however, it will be appreciated that the invention is equally applicable to any form of membrane module and may be employed in a wide variety of filtration systems used to remove unwanted solids from a liquid feed.

BRIEF DESCRIPTION OF THE DRAWINGS

Preferred embodiments of the present invention will now be described, by way of example only, with reference to the accompanying drawings in which:—

FIGS. 7a to 7c show an end elevation view, underside view and perspective view respectively of a head piece used in conjunction with module of FIG. 1;

FIG. 11 shows an isometric view of the underside of a potting insert of the upper potting head of FIG. 8a;

MODES FOR CARRYING OUT THE INVENTION

Figure 2:
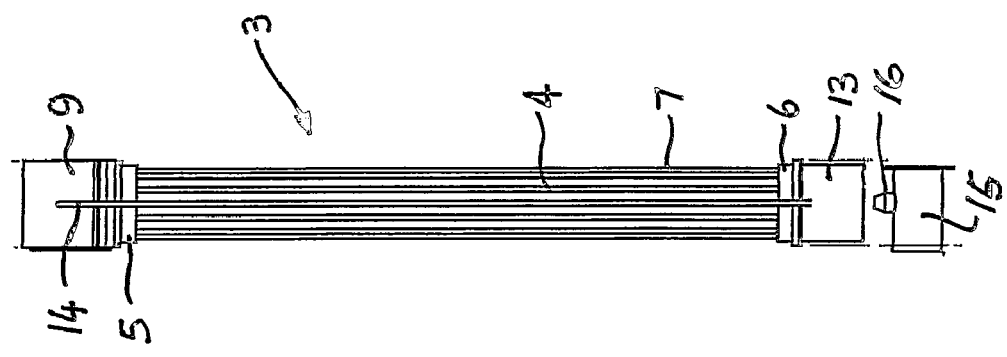
FIG. 2 shows a simplified end elevation view of the module of FIG. 1.
Figure 1:
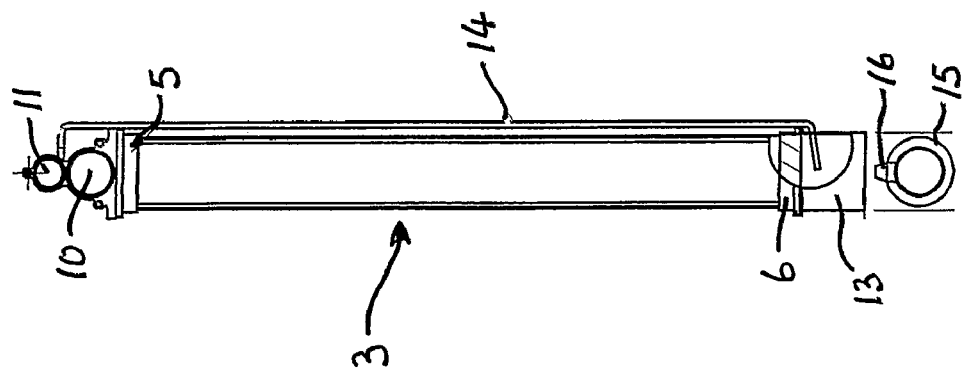
FIG. 1 shows a simplified end elevation view of one embodiment of a membrane module in accordance with the present invention.
Figure 3:
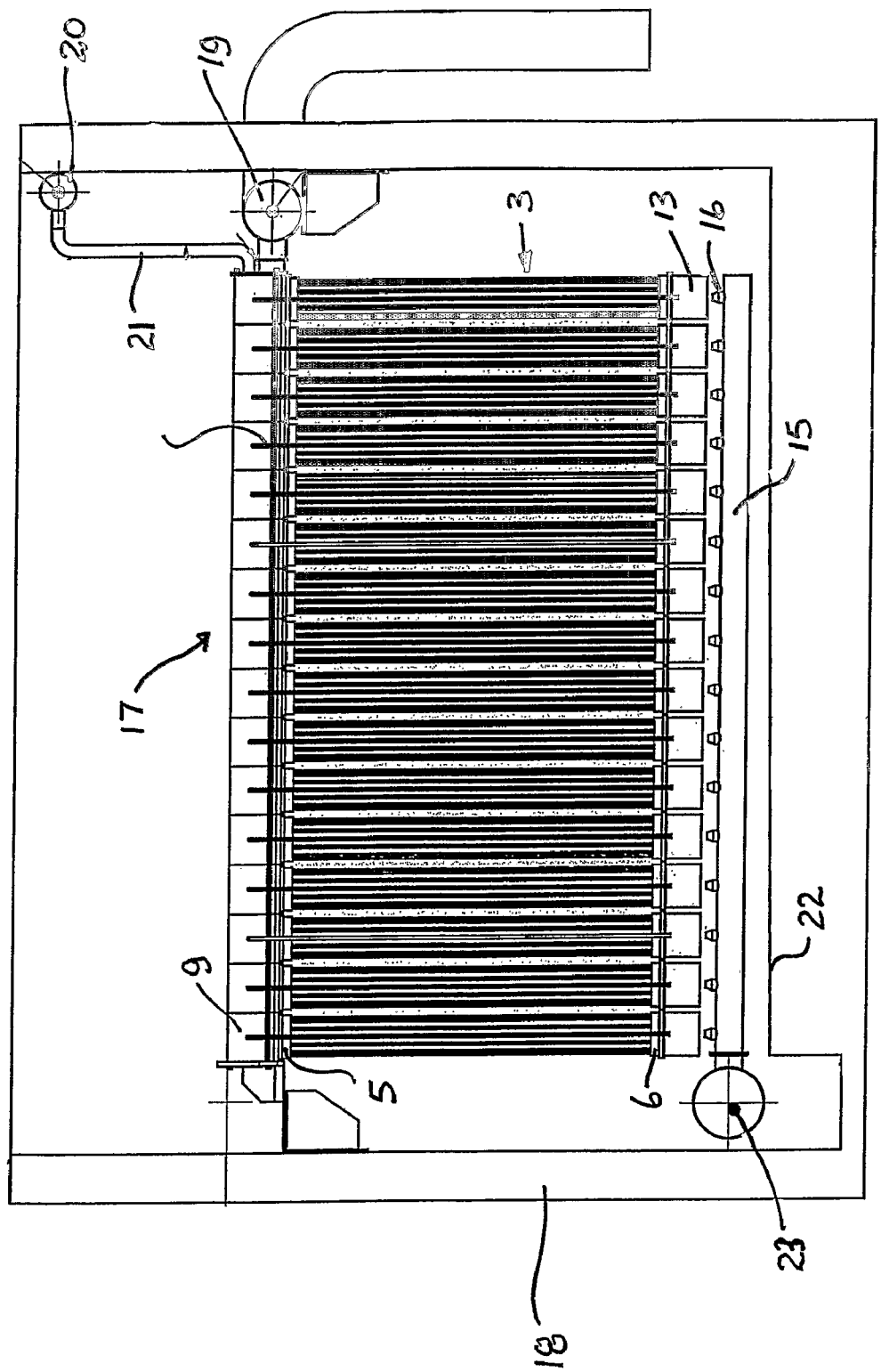
FIG. 3 shows a sectional side elevation view of one cell of the filtration system according to one embodiment of the invention showing a rack of membranes modules of the type shown in FIGS. 1 and 2.
Figure 4:
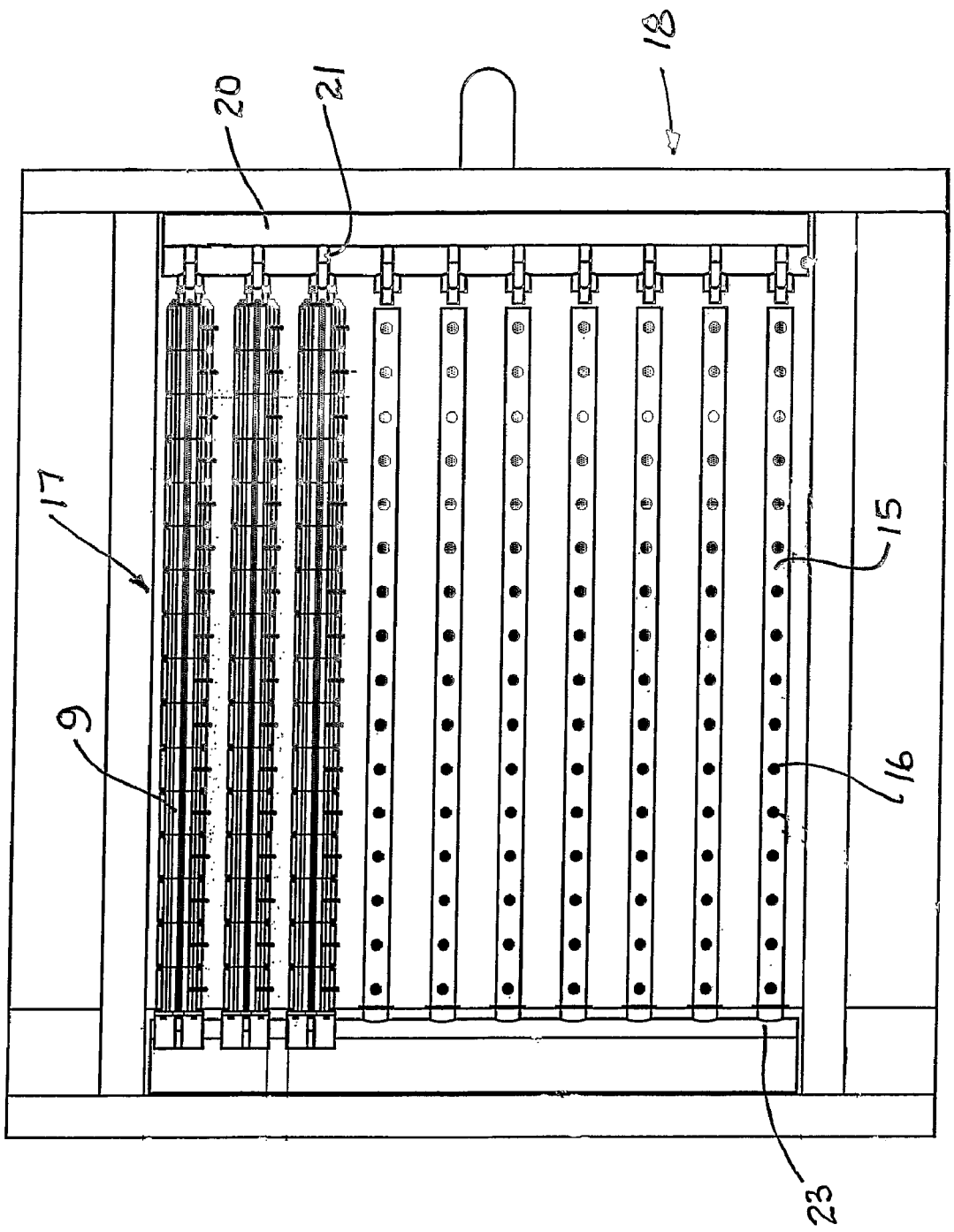
FIG. 4 shows a plan view of the cell of FIG. 3 with some of the membrane module racks installed.
Figure 6:
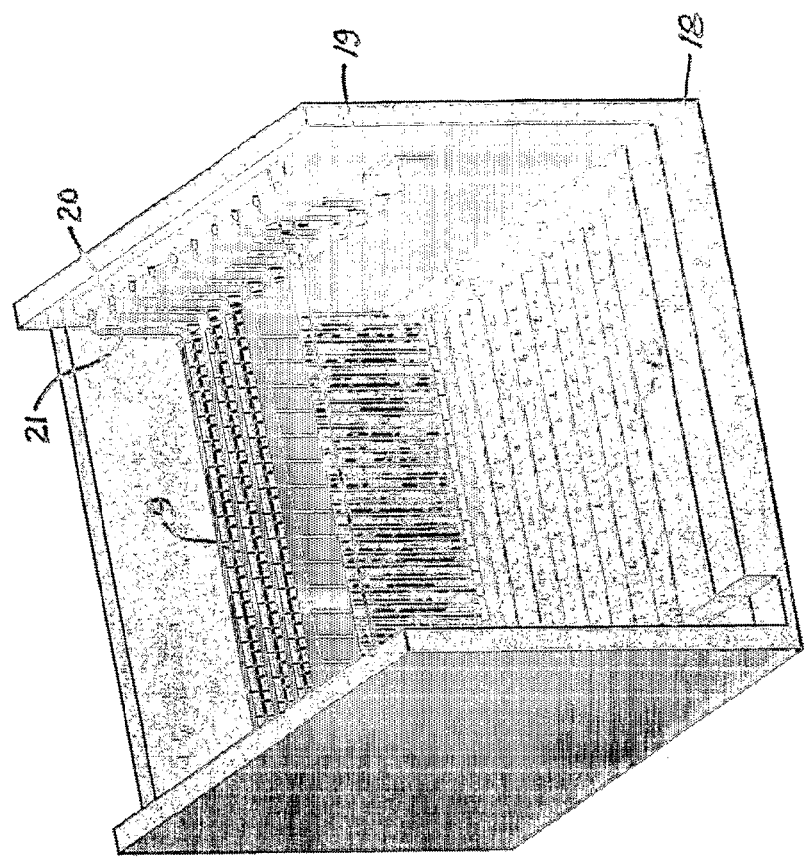
FIG. 6 shows a pictorial rear perspective view of the cell of FIG. 3.
Figure 5:
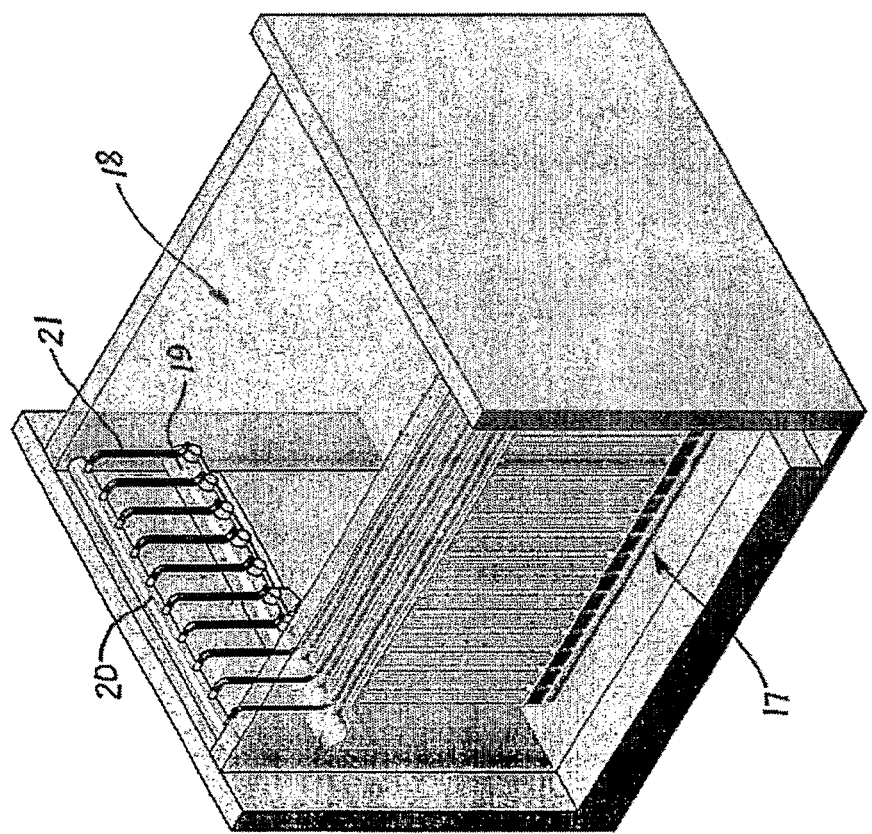
FIG. 5 shows a pictorial front perspective view of the cell of FIG. 3.

Referring to FIGS. 1 and 2, the membrane module 3, according to this embodiment, comprises a square-shaped in section array or bundle of hollow fibre membranes 4 extending longitudinally between upper and lower generally square shaped in section potting heads 5 and 6, respectively. While a square shaped module is shown and described it will be appreciated that other regular straight-sided shapes such as rectangular or triangular could also be employed. Such cross-sectional shapes enable closer packing of the modules.

A number of longitudinally extending spacer support rods 7 are positioned between the upper and lower potting heads 5 and 6. These rods are preferably potted into the upper and lower potting heads 5 and 6 during the potting process.

A screen or sleeve (not shown) at least partially surrounds the fibre bundles 4 along part of their length and serves to hold the fibres 8 in close proximity to each other, prevent excessive movement therebetween and prevent damage during handling. The screen also serves to entrain the gas and mixed liquor within the module 3.

The fibres 8 are open at the upper potting head 5 to allow for filtrate removal from their lumens and sealed at the lower potting head 6. A modular headpiece 9 is sealingly attached to the upper potting head 5 and is in fluid communication with the open ends of the fibres 8. The headpiece 9 includes a pair of conduits 10 and 11 extending above the potting head 5. Conduit 10 is a filtrate conduit and conduit 11 is a gas/air conduit.

The lower potting head 6 has a number of openings 12, in this case slots, distributed therein to enable the two phase mixture of gas/air and mixed liquor formed in the skirt region to be supplied therethrough. Although slots 12 are shown it will be appreciated that any form and shape of opening may be used including a linear array of closely spaced holes. The fibres 8 are fixed in partitioned bundles 4 within the potting heads 5 and 6 and the slots 12 open into the region 13 between each partitioned bundle 4 so as to provide, in use, a distribution of gas bubbles and mixed liquor between the fibres 8.

The lower potting head 6 is provided with a downwardly extending skirt 13 for conveying gas/air and mixed liquor to the slots 12 in the lower potting head 6. A dropper tube 14 extends from the gas/air conduit 11 in the headpiece 9 into the side of the skirt 13 for, in use, feeding gas/air thereto. In one embodiment one or more of the spacer support rods 7 are hollow and are used to feed gas from the conduit 11 to the skirt 13 in place of the dropper tube 14.

A mixed liquor pipe 15 is positioned below the skirt 13 and provided with jets 16 for feeding mixed liquor into the skirt 13. The skirt 13 functions to provide a confined space to allow gas/air to be mixed with the mixed liquor flow from the jet 16 before entering the slots 12 in the lower potting head 6. Optionally, the mixed liquor pipe may be omitted and delivery of feed to the skirt is achieved by complete mixing within the feed tank 18.

As best shown in FIGS. 3 to 6, the modules 3 of the type described above are formed into a module rack 17 by connecting the head-pieces 9 to form a manifold rack support from which the modules 3 are suspended. The modules 3 may also be connected at the lower potting heads 6 if desired. Typically, the lower potting heads 6 are provided with interlocking formation which enable the modules to be slid together vertically. It will be appreciated that other forms of interlocking and clipping may also be used. In this type of configuration the screen described above for each module 3 may be replaced by a rack screen which at least partially surrounds a rack of modules in a similar manner to the individual module screens.

The module racks 17 are positioned in a cell or feed tank 18 with the conduits 10 and 11 of the headpiece 9 of one end module being coupled to the main filtrate and gas headers 19 and 20, respectively. A hose 21 is used to connect the main gas header 20 to the conduit 11 of each rack 17.

The racks 17 are suspended above a mixed liquor pipe 15, which extends along the bottom 22 of the cell 18 and has spaced jets 16 positioned along the pipe at locations below the skirt 13 of each module 3. In this embodiment, a mixed liquor header 23 is positioned at one end of the cell 18 and connects each of the mixed liquor pipes 15 to a source of mixed liquor (not shown). In other embodiments mix liquor headers may be provided at both ends of the cell.

Referring to FIGS. 7a to 7c, the headpiece 9 is shown in detail. The headpiece 9 includes a pair of cylindrical conduits 10 and 11 extending parallel to each other and the gas/air conduit 11 being positioned above the filtrate conduit 10. The lower filtrate conduit 10 has an open wall 24 in fluid communication with a coupling flange 25 which, in use, is sealingly connected to the upper potting head 5 of each module 3. The ends 26 of the headpiece 9 are provided with formations 27 which enable the headpieces 9 of a number of modules 3 to be sealingly connected to each other to form a rack of modules 17 and provide fluid communication between associated conduits 10 and 11 along the length of the rack formed. The headpieces 9 are constructed to be of sufficient strength to support the modules 3 when formed into a rack 17.

A hollow spigot tube 28 extends from the upper gas conduit 11 to allow connection of the dropper tube 14.

Figure 8A:
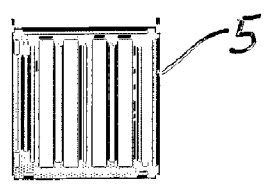
FIGS. 8a to 8c show a plan view, side elevation view and underside view respectively of a membrane bundle and upper and lower potting heads used in the module of FIG. 1.
Figure 8B:
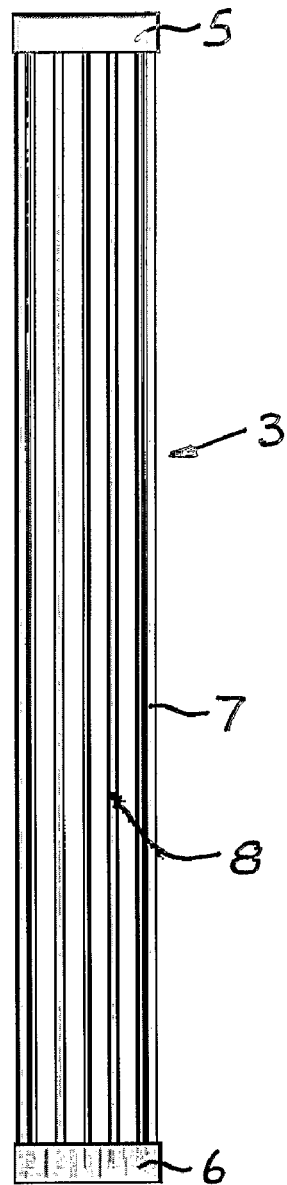
Figure 8C:
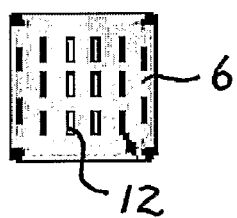
Figure 9:
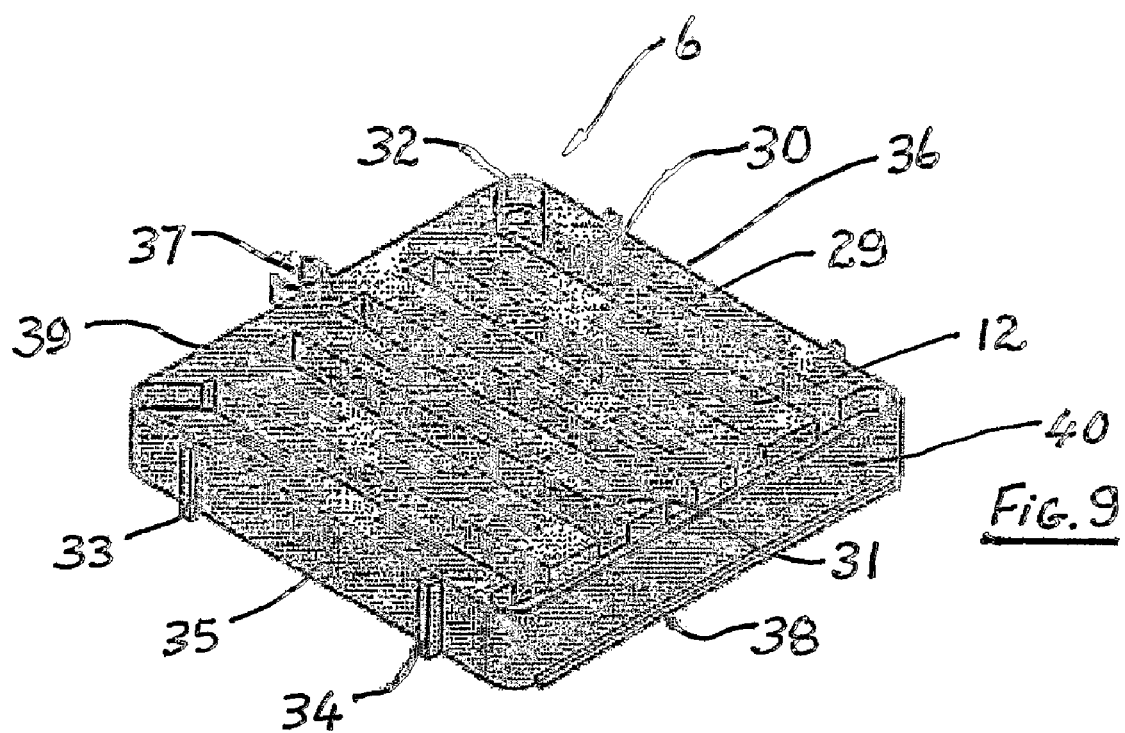
FIG. 9 shows a perspective view of the upper side of the lower potting head of FIG. 8c.
Figure 10:
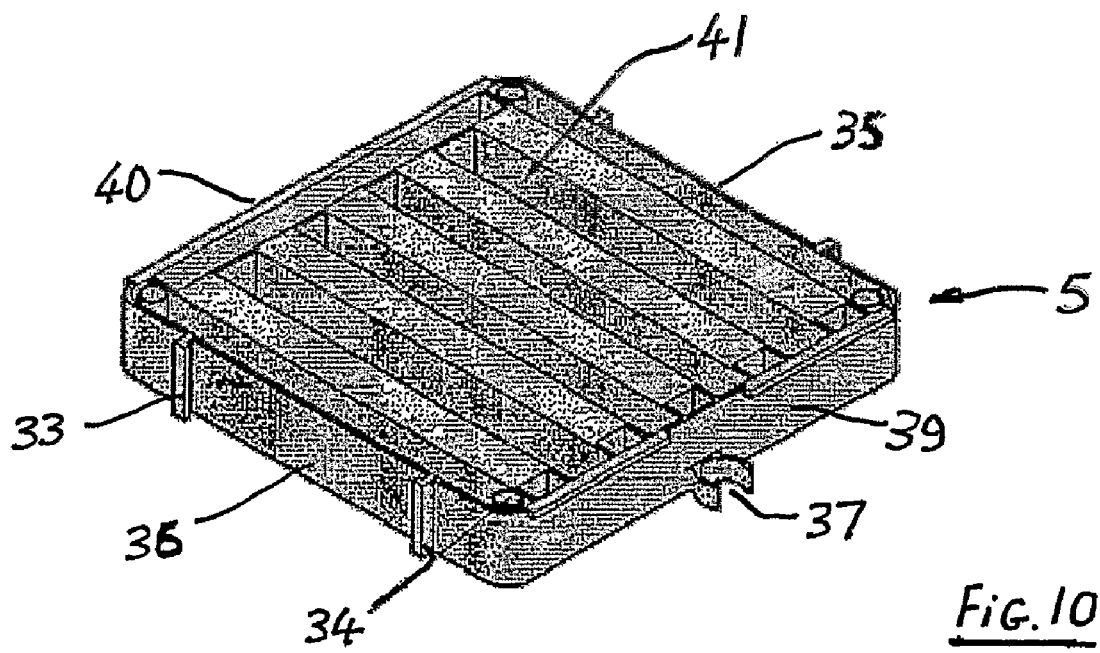
FIG. 10 shows a perspective view of the under side of the lower potting head of FIG. 9.

FIGS. 8c, 9 and 10 show in more detail the lower potting head 5. The lower potting head 5, in this embodiment, comprises a potting element 29 preformed from injection molded plastic material, typically nylon. It has been found that by minimising the amount of curable potting material (usually polyurethane) required to mount the hollow fibre membranes in the potting heads significant cost saving can be achieved.

Referring to FIG. 9 the lower potting head 5 comprises a preformed potting element 29 having a number of spaced, parallel extending membrane insertion channels 30 formed therein. The island areas 31 between each insertion channel 30 have the slots 12 formed therein. A moulded cavity 32 is provided in each corner of the element 29 for receiving the ends of the spacer support rods 7. For preference, the cavities 32 for the rods 7 may be isolated with a wall from the potting channels 30 for the fibres 8. This allows the fibres 8 to be potted separately from the rods 7. This gives a precise and easy method of creating fibre slack. The fibres 8 can be potted first with no slack, then the rods 7 can be lowered down into their cavities and potted separately after the potting material around the fibres 8 has partially or fully cured. The distance the rods 7 are lowered at this second stage creates the same amount of fibre slack, without the need to grip and manipulate fibres 8. This is particularly advantageous when the fibres 8 are in the form of mats which are difficult to grip and manipulate without causing fibre damage.

A pair of vertically extending module interlock clips 33 and 34 are provided on a pair of opposed sides 35 and 36 of the potting element 29. In this embodiment a tube clip 37 is molded into one side of the element 29 for retaining the dropper tube 14, though it will be appreciated a separate non-integral clip may also be used. A skirt clip ledge 38 is this embodiment formed along the lower edge of opposed sides 39 and 40 of the element 39 for attachment of the skirt 13. It will be appreciated that any suitable formation may be used to attach the skirt 13 to element 39 and the formation/s may be provided at any suitable location on the opposed sides 39 and 40.

FIG. 10 shows the underside of the lower potting head 5. The regions between the channels 30 are open to form fluid distribution openings 41 beneath the slots 12.

In use, the membrane insertion channels 30 are at least partially filled with curable potting material into which the fibre membranes 8 are potted. This serves to reduce the amount of material required while also providing a strong, durable potting head.

Figure 11:
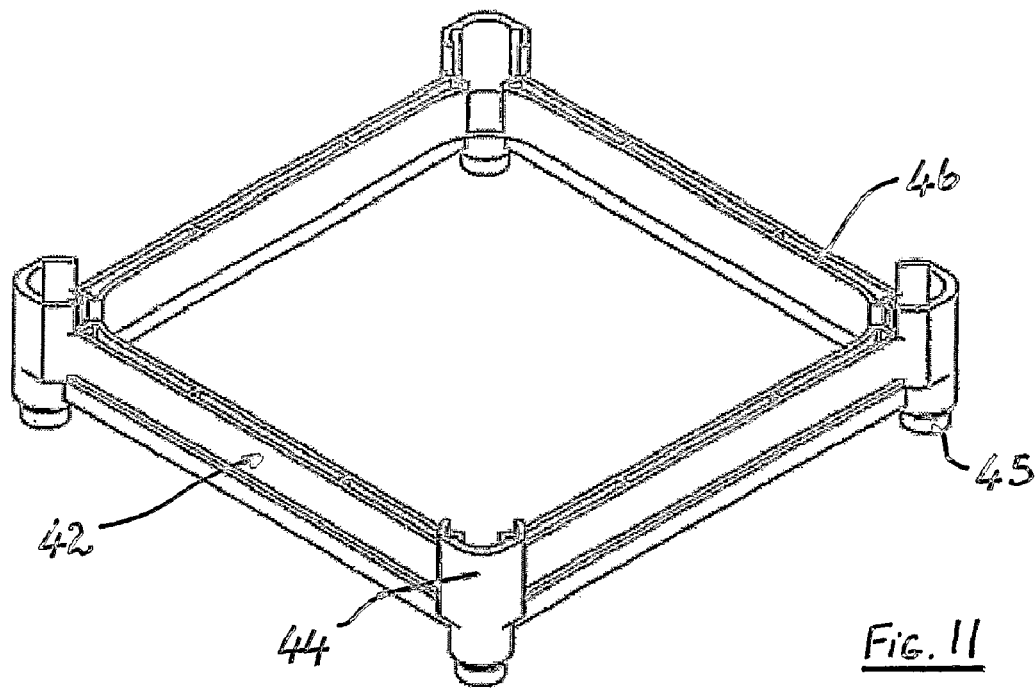
Figure 12:
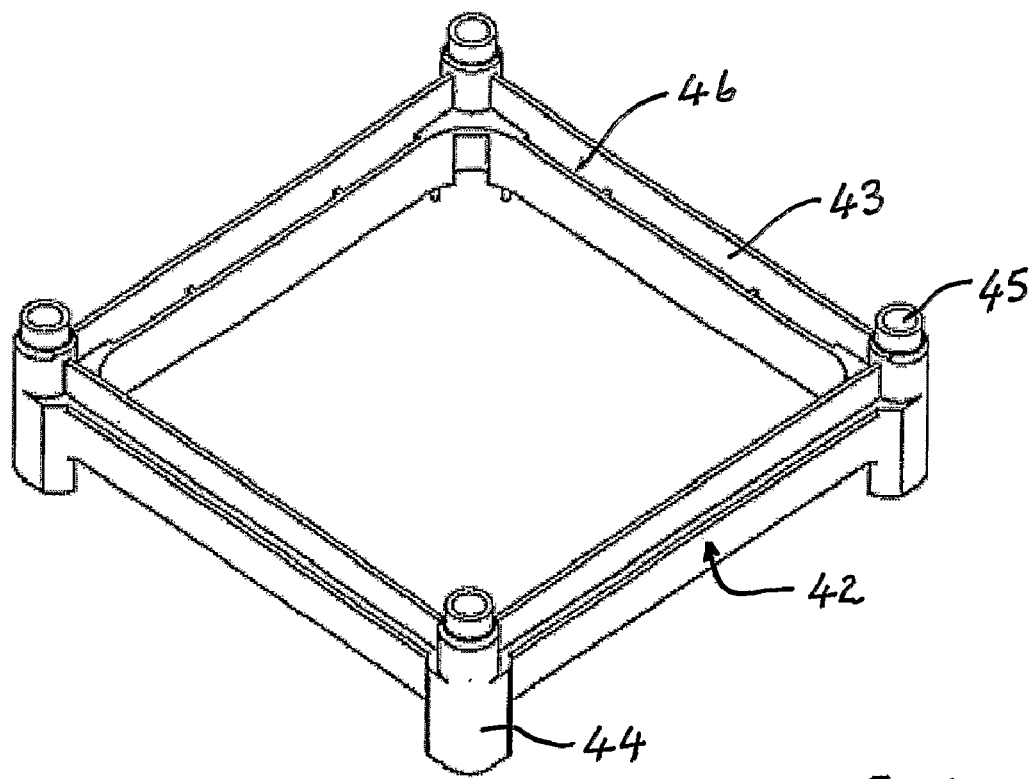
FIG. 12 shows an isometric view of the upper side of a potting insert of FIG. 11.

Referring to FIGS. 11 and 12, the upper potting head 6 is formed of potting insert 42 which surrounds an reinforces a pot (not shown) formed from typical potting material, such as polyurethane, into which the upper ends of the fibre membranes 8 are potted. The potting insert 42 is provided with an upwardy open groove 43 extending around its upper side for receipt of o-ring seal. Each corner of the potting insert 42 is provided with a rod location formation 44 for receipt of the spacer support rods 7. Threaded stainless steel inserts 45 are provided in each rod location formation 44 to enable threaded engagement with the rods 7. Openings 46 are formed in the lower side of the insert 42 to allow keying with the potting material.

Figure 13:
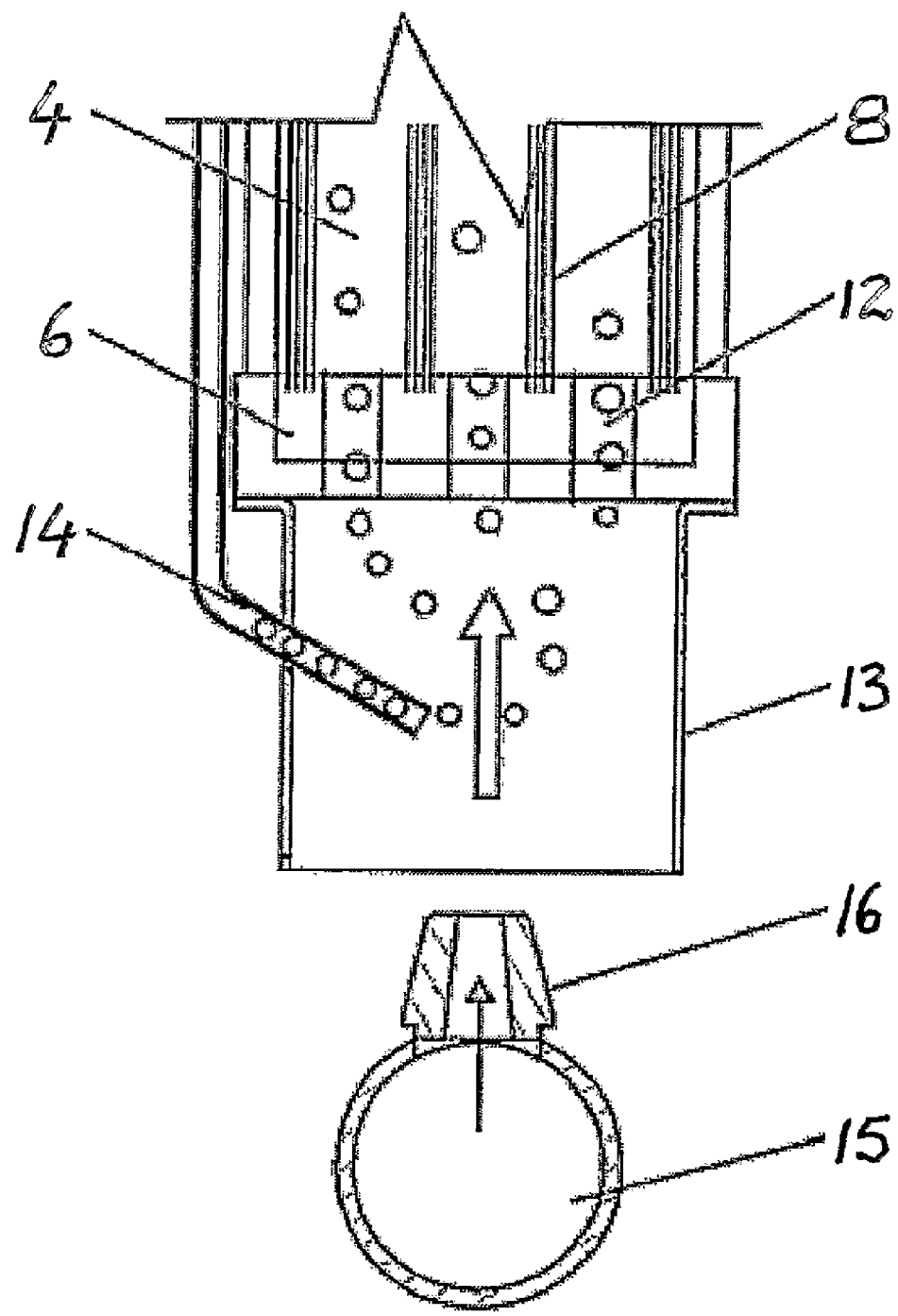
FIG. 13 shows a simplified sectional view of the base of the module of FIG. 1.

The operation of the bioreactor arrangement will now be described with reference to FIG. 13. In use, mixed liquor is fed into the membrane modules 3 through main header 23, pipes 15 and jets 16. The mixed liquor is injected into the base of the skirt 13 and is then mixed with gas, typically air, within the skirt 13 to form a two phase stream of the gas/air and mixed liquor. The air is fed into the skirt 13 through dropper tube 14 which is connected to the gas/air conduit 11 of the headpiece 9. The gas/air conduit 11 is in turn connected to the main gas/air header 20 by a hose 21.

The mixed liquor and gas mixture formed in the skirt then passes upward through the openings 12 in the lower potting head 6 and into the fibre membrane bundles 4. Filtrate is withdrawn from the fibre lumens and passes out of the open ends of the fibres in the upper potting head 5 and into the headpiece 9. In the headpiece 9 the filtrate passes through the wall opening 24 into the filtrate conduit 10 and along the joined headpieces of the module rack 17 to the main filtrate header 19. Filtrate is typically withdrawn from the fibre membranes by applying suction to the filtrate header 19.

The system while described in respect of a bioreactor may be used for treatment surface or drinking water, sewage/biological waste treatment or combined with an activated sludge or similar system.

It will be appreciated that further embodiments and exemplifications of the invention are possible without departing from the spirit or scope of the invention described.

The invention claimed is:

1. A membrane module comprising:
   a first header having one or more openings formed therein;
   a plurality of porous hollow membranes arranged in partitioned bundles, each of the porous hollow membranes extending between and being fixed at a first end in the first header and at a second end in a second header, the one or more openings formed in the first header positioned to coincide with spaces formed between the partitioned bundles; and
   a headpiece sealingly connected to and in fluid communication with the second header, the headpiece comprising:
      a filtrate conduit in fluid communication with open ends of said membranes for the withdrawal of filtrate therefrom; and
      a gas conduit configured to communicate gas to the module through the one or more openings formed in the first header, the gas conduit in communication with a source of gas; and a pipe or tube connected to the gas conduit of the headpiece positioned below the one or more openings formed in the first header.

2. The membrane module according to claim 1, wherein the module is rectangular shaped in cross-section.

3. The membrane module according to claim 1, further comprising a skirt provided below the first header.

4. The membrane module according to claim 3, wherein said membranes are mounted vertically, and wherein a source of liquid including an opening in a conduit is positioned below the skirt.

5. The membrane module according to claim 4, wherein said opening comprises a jet.

6. The membrane module according to claim 3, wherein the source of gas includes a pipe or tube passing through a sidewall of the skirt, the distal end of the pipe being positioned below the one or more openings formed in the first header, the pipe configured for feeding gas to the one or more openings.

7. The membrane module according to claim 1, wherein the skirt is arranged to mix gas and liquid before passing the mix of gas and liquid through the one or more openings formed in the first header.

8. The membrane module according to claim 1, wherein the headers are spaced and supported by one or more support members longitudinally extending between the headers.

9. The membrane module according to claim 8, wherein the support members comprise rods.

10. The membrane module according to claim 8, further comprising a skirt provided below the first header, wherein one of more of the support members comprise hollow tubes configured to supply gas to the skirt from the gas conduit.

11. The membrane module according to claim 1, wherein the membranes are enclosed along part of their length by a screen configured to retain gas bubbles and liquid flow within the module.

12. The membrane module according to claim 11, wherein the screen is substantially impervious to at least one of the gas bubbles and liquid.

13. The membrane module according to claim 1, wherein the membranes comprise porous hollow fibres.

14. The membrane module according to claim 13, wherein the fibres are sealed at a lower end and open at an upper end.

15. The membrane module according to claim 1, wherein the one or more openings formed in the first header comprise at least one of a slot, slots, and one or more rows of holes.

16. The membrane module according to claim 15, wherein the fibre bundles are fixed at an end thereof in a potting head between the slots or the one or more rows of holes.

17. The membrane module according to claim 1, wherein the head-piece is adapted to couple to an associated head-piece of a further module to form a rack of modules and to provide fluid communication between the filtrate conduit and a filtrate conduit of the further membrane module and to provide fluid communication between the gas conduit and a gas conduit of the further module.

18. A membrane module rack comprising:
a plurality of membrane modules, each of the plurality of membrane modules including:
a plurality of porous hollow membranes, the membranes arranged in partitioned bundles, the membranes extending between and fixed at each of a first and a second end in a header;
a first header having one or more of openings formed therein, the openings positioned to coincide with spaces formed between the partitioned bundles, the openings in fluid communication with at least one of a source of gas and a source of liquid;
a second header sealingly connected to and in fluid communication with a head-piece including a gas conduit configured to communicate gas to the module;
a source of gas in communication with the gas conduit a pipe or tube connected to the gas conduit of the head-piece positioned below the one or more openings formed in the first header;
the head-piece adapted to couple to an associated head-piece of a further module to form a rack of modules and to provide fluid communication between the gas conduit and a gas conduit of the further module;
the plurality of membrane modules connected together by the headpieces.

19. The membrane module rack according to claim 18, wherein the first headers are connected together by interlocking formations provided on the first headers of the modules.

20. The membrane rack of claim 18, further comprising a skirt provided below the first header, the source of gas including a pipe passing through a sidewall of the skirt, a distal end of the pipe being positioned below the one or more openings formed in the first header.

21. A filtration system comprising:
a rack of membrane modules, each of the membrane modules including:
a plurality of porous hollow membranes arranged in partitioned bundles, the membranes extending between and being fixed at a first end in a first header and at a second end in a second header;
the first header having one or more openings formed therein, the one or more openings positioned to coincide with spaces formed between the partitioned bundles, the one or more openings being in fluid communication with at least one of a source of gas and a source of liquid;
a skirt provided below the first header;
the second header sealingly connected to and in fluid communication with a head-piece, the headpiece including a filtrate conduit in fluid communication with open ends of the membranes and adapted to couple to an associated head-piece of a further module to form a rack of modules and to provide fluid communication between the filtrate conduit and a filtrate conduit of the further module;
a gas conduit formed in the headpiece and in communication with a source of gas; a pipe or tube connected to the gas conduit of the headpiece positioned below the one or more openings formed in the first header;
wherein the modules are positioned vertically in a tank containing feed liquid to be filtered; and
a source of suction configured to provide a transmembrane pressure to the membranes in the modules to cause filtrate to pass through pores in the membranes, the source of gas configured to at least one of continually or intermittently supply gas to the one or more openings so as to produce gas bubbles which move upwardly between the fibres to scour the outer surfaces thereof.

22. The filtration system according to claim 21, wherein the supply of gas to the one or more openings formed in the first header includes a mixture of gas and liquid.

* * * * *

UNITED STATES PATENT AND TRADEMARK OFFICE
CERTIFICATE OF CORRECTION

PATENT NO. : 7,862,719 B2
APPLICATION NO. : 11/660694
DATED : January 4, 2011
INVENTOR(S) : McMahon et al.

Page 1 of 1

It is certified that error appears in the above-identified patent and that said Letters Patent is hereby corrected as shown below:

Column 7, line 42 replace Claim 18 with the following:

18. A membrane module rack comprising:
a plurality of membrane modules, each of the plurality of membrane modules including:
a plurality of porous hollow membranes, the membranes arranged in partitioned bundles, the membranes extending between and fixed at each of a first and a second end in a header;
a first header having one or more of openings formed therein, the openings positioned to coincide with spaces formed between the partitioned bundles, the openings in fluid communication with at least one of a source of gas and a source of liquid;
a second header sealingly connected to and in fluid communication with a head-piece including a gas conduit configured to communicate gas to the module;
a source of gas in communication with the gas conduit;
a pipe or tube connected to the gas conduit of the headpiece positioned below the one or more openings formed in the first header;
the head-piece adapted to couple to an associated head-piece of a further module to form a rack of modules and to provide fluid communication between the gas conduit and a gas conduit of the further module;
the plurality of membrane modules connected together by the headpieces.

Signed and Sealed this
Eighteenth Day of September, 2012

David J. Kappos
*Director of the United States Patent and Trademark Office*